Oct. 6, 1931.  R. S. HOPKINS  1,826,664
INDICATING DEVICE FOR DOCUMENT PHOTOGRAPHING APPARATUS
Filed May 23, 1929  2 Sheets-Sheet 1
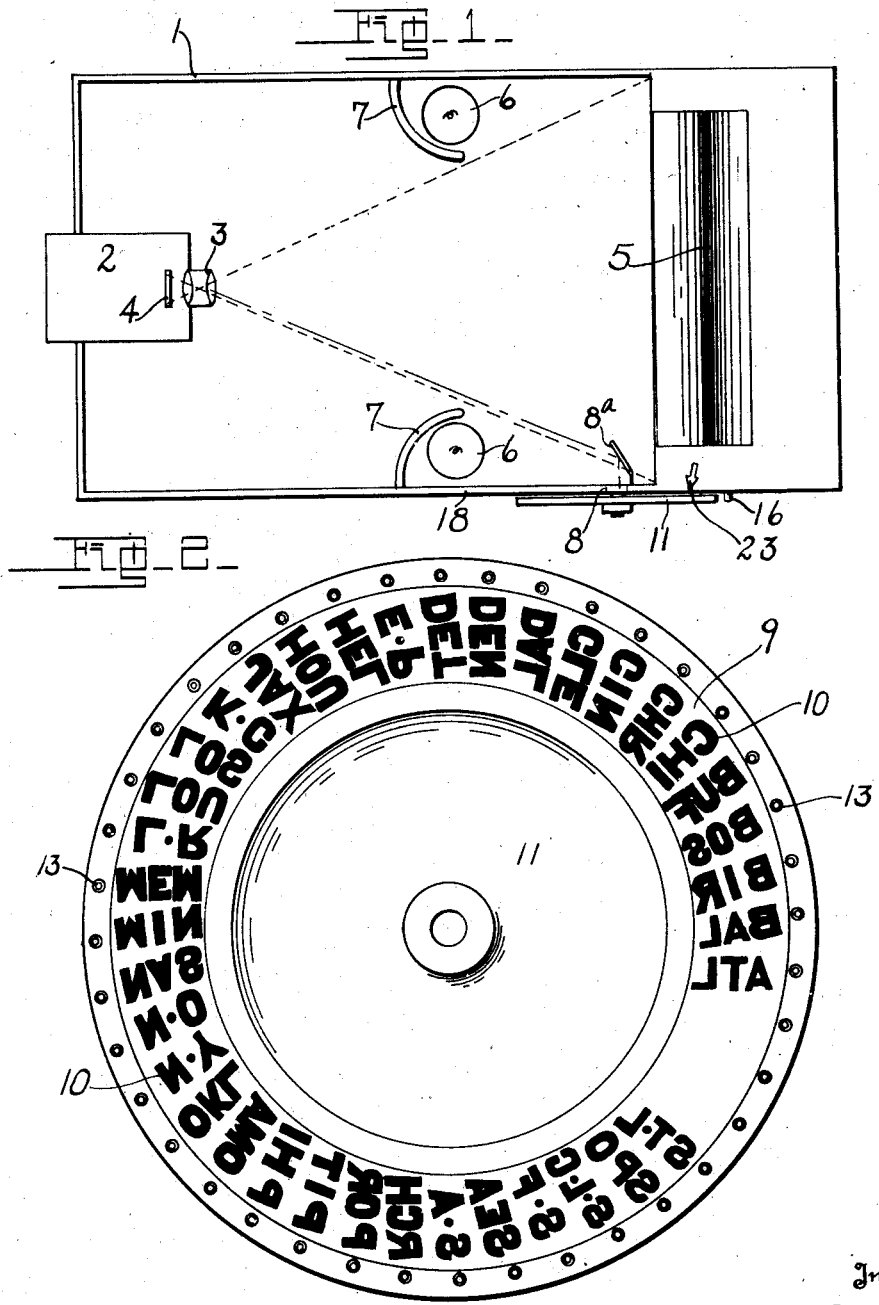

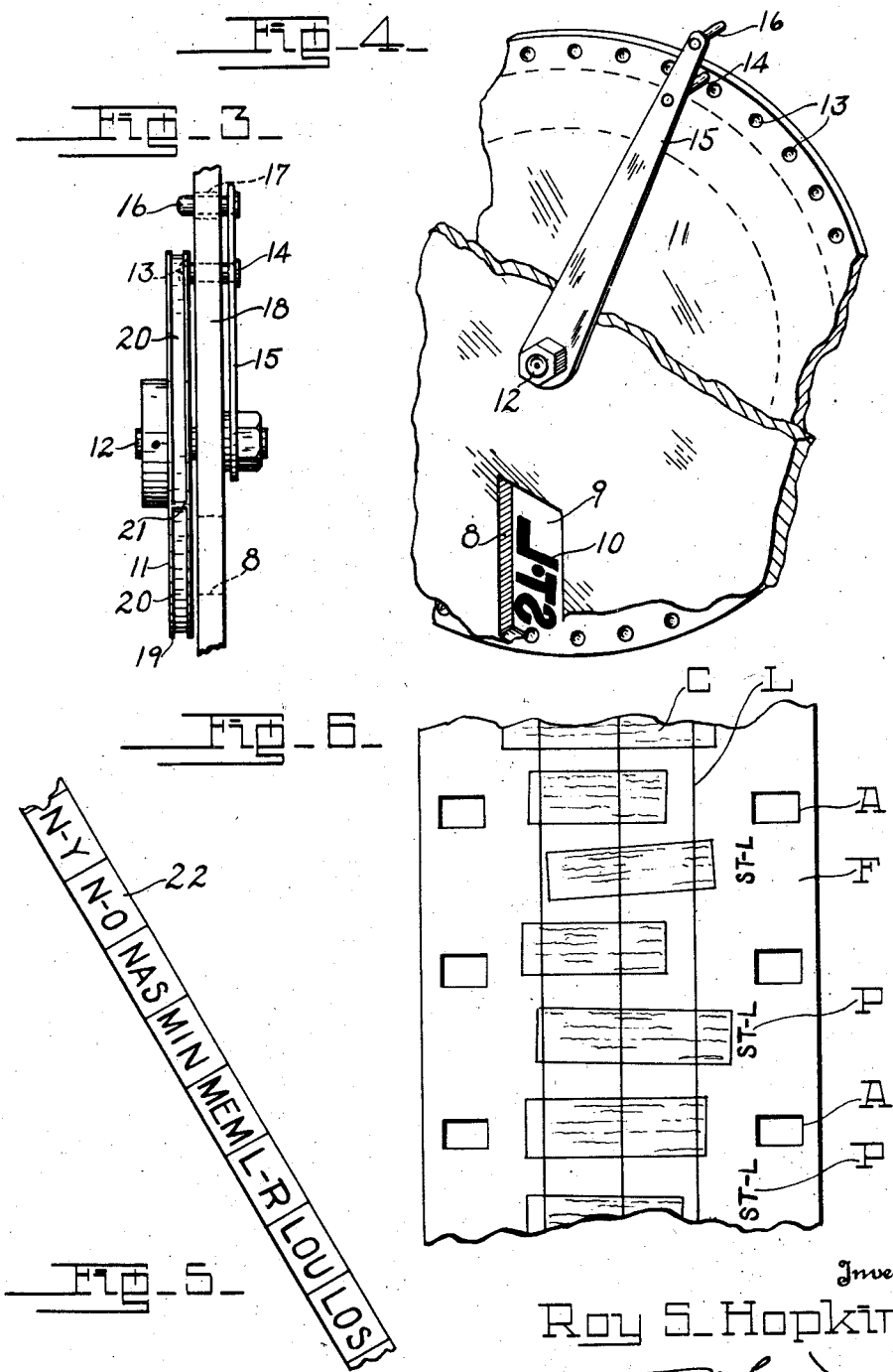

Patented Oct. 6, 1931

1,826,664

UNITED STATES PATENT OFFICE

ROY S. HOPKINS, OF ROCHESTER, NEW YORK, ASSIGNOR TO EASTMAN KODAK COMPANY, OF ROCHESTER, NEW YORK, A CORPORATION OF NEW YORK

INDICATING DEVICE FOR DOCUMENT PHOTOGRAPHING APPARATUS

Application filed May 23, 1929. Serial No. 365,377.

This invention relates to photography and more particularly to indicating devices for automatic document photographing apparatus. One object of my invention is to provide a device by which different legends will be placed in the field of a camera objective, said device being adjustable from the outside of the machine. Another object of my invention is to provide an indicating device having a plurality of legends, any one of which may be made to appear within the camera field by adjusting a movable member on which the legends are carried. Another object of my invention is to provide a rotatable carrier for a plurality of legends, said rotatable carrier also having a visible scale for use in adjusting the carrier so that the proper designating mark may appear in the field of the camera. Another object of my invention is to provide a movable member adapted to carry a plurality of legends with a latching device adapted to hold the carrier and with it any one legend in position for exposure. Still another object of my invention is to provide a designating device which may be adapted to machines now in use and which is simple to construct and operate, and other objects will appear hereinafter from the following specification, the novel features being particularly pointed out in the claims at the end thereof.

Coming now to the drawings wherein like reference characters denote like parts throughout:

Figure 1 is a diagrammatic top plan view of a document photographing machine equipped with an indicating device constructed in accordance with and embodying a preferred form of my invention;

Figure 2 is a side elevation of the designating device removed from the photographing machine;

Figure 3 is a fragmentary end elevation of the designating device mounted on a wall of a photographing machine;

Figure 4 is a fragmentary detail partially in section showing a portion of the indicating device and latching means;

Figure 5 is a fragmentary section of a scale removed from the indicating device; and Figure 6 is an enlarged fragmentary section of a film made in a photographing machine and provided with designating marks made with the indicator shown in the drawings.

The designating device which will be hereinafter more fully described can be either built in or can be adapted to an automatic document photographing machine such as that shown in my co-pending application, Serial Number 237,467 for document photographing apparatus, filed December 3, 1927. These machines as described in that application are designed primarily for making a series of photographs of checks for banking purposes although, of course, other documents of suitable size may be photographed.

In photographing large numbers of checks it has been found necessary to sort the checks in accordance with the Federal reserve district to which the checks are to be charged and it has also been found useful to provide on the finished film legends or characters which will show to which Federal reserve district the photographed checks are to be sent or charged.

In accordance with my invention I have provided what I prefer to call a designation indicator which is a movable member bearing marks or symbols which may be photographed on the film at the time the checks are being photographed.

Since a full disclosure of the photographing apparatus is shown in my above mentioned patent application I have only shown such parts in Figure 1 as are necessary for a complete understanding of the present invention. In Figure 1 the photographing apparatus or machine is designated broadly as 1, this machine being in the form of a casing or housing in which a camera 2 may be mounted, the camera having an objective 3 and a film gate 4 through which long strips of film may be drawn.

Checks or documents to be photographed may be moved into the field of the camera lens 3 through a chute 5 and a conveyor automatically moves the documents into position for exposure. The checks or documents may be illuminated by lamps 6 which are arranged behind reflectors 7 to evenly illuminate the checks.

In order to place an indication of the Federal reserve district to which the checks may be charged or in order to place other desired information on the photographic film, I provide a designation indicator which may be moved to bring different designating marks into the field of view of the camera. The mark so positioned will be photographed on the film after being reflected by a mirror 8a through a window 8 which masks off the remaining part of the scale bearing the legends.

As best indicated in Figure 2 the scale or band 9 carrying a plurality of designating characters 10 is carried by a movable member in the form of a wheel 11 which may be mounted upon a shaft 12 as shown in Figure 3.

In the present instance the legends on the scale 9 indicates different Federal reserve districts as: Atlanta, Baltimore, Boston, Birmingham, Buffalo, Chicago, etc.

I prefer to make the scale 9 of some highly reflective material such as white cardboard, nitrocellulose or the like and I prefer to provide the legends in a strongly contrasting color as black. The scale 9 or rather that part of the scale 9 which lies behind window 8 is illuminated from a lamp 6, light rays being reflected by means of the mirror 8a. As indicated in Figure 1 the surface of the scale 9 lies substantially the same distance from the objective 3 as the surface 11 which holds the check in position for exposure.

In order to properly locate the legends 10 with respect to the window 8 as shown in Figures 3 and 4, I provide a series of holes 13 spaced in accordance with the legends and these apertures are located in the path of a snap latch consisting of a pin 14 carried by a spring arm 15 which is mounted on the shaft 12. The latch can be thrust from latching position by means of a plunger 16 which extends through an aperture 17 in the side wall 18 of the photographing apparatus.

As also best shown in Figure 3 the edge 19 of the wheel 11 is grooved as indicated at 20. Across this groove I prefer to provide one or more bars 21 which may serve to locate the indexing strip or strips 22. These strips may be etched plates of such thickness that they can be readily bent around the periphery of wheel 11.

By bringing the proper legend on the scale 22 opposite an arrow 23 (Figure 1) and permitting the snap latch to enter an aperture 13 the operator properly positions the corresponding designating mark 10 on the scale 9 into position for exposure. The designating marks on the scale 9 and on the indexing scale 22 are, of course, arranged in a pre-determined relation with respect to each other.

Because of the small scale on which the wheel 11 of Figure 1 is drawn the legends shown in Figure 5 are not shown.

The device can be readily adjusted and the operation is as follows: If a series of checks to be charged to the St. Louis Federal Reserve District for instance, are being photographed, an operator presses in on the finger release 16 on the side wall 18 of the machine thus releasing the snap latch and permitting the wheel 11 to turn freely until the legend St. L. on the indexing scale 22 appears opposite the arrow 23. This will bring the legend 10 of scale 9 opposite the window 8 as indicated in Figure 4 and the mirror 8a will reflect the letters, which are here shown as being backwards, into a position in which they will be photographed on the film by means of the camera 2.

The resulting film, as shown in Figure 6, will carry images C of the checks on the film base F, the lines L being the images produced of the wires which hold the checks in position for exposure. A indicates the usual film apertures and the designating character, indicating in this instance the St. Louis Federal Reserve District, is photographed on the film at P.

When a Federal reserve district is to be changed on the film it is only necessary for the operator to again release the snap latch and turn the wheel 11 to the desired place. By having the snap latch move into an aperture 13 it is an easy matter to properly position the movable member 11 as the operator can tell by the feel of the wheel whether or not it is properly positioned.

Having thus described my invention, what I claim as new and desire to secure by Letters Patent is:

1. In a photographic recording machine, the combination with a camera, of an objective for focusing objects at a predetermined distance on a photographic film, an adjustable member bearing a plurality of designating marks adapted to be moved to bring one mark into the field of the objective in position to be photographed, and visible means for moving the adjustable member to a predetermined location.

2. In a photographic recording machine the combination with a camera, including an objective of an indicator for placing predetermined data in the field of the camera objective including a movable device bearing two scales, one for indicating to an operator the setting of the other scale, said second mentioned scale lying in position to be photographed by the camera.

3. In a photographic recording machine, the combination with a camera, of an objective for focusing objects at a predetermined distance on a photographic film, a pivotally mounted member located in the field of the objective and having a plurality of designating marks thereon, visible indicating devices on the outside of the pivotal member arranged in a predetermined relation to the designating marks, whereby the first mentioned designating marks may be located by the second mentioned marks.

4. In a photographic recording machine, the combination with a cabinet having walls one of which is apertured, of a camera mounted thereon, a movable member mounted near the aperture in the wall and having data carried thereon movable past the aperture, a snap latch for holding the movable member in a predetermined position with respect to said aperture, and visible means carried by the movable member for adjusting the data appearing at said aperture, said camera being adapted to photograph data at said window.

5. In a photographic recording machine, the combination with a cabinet having walls one of which is apertured, of a camera mounted thereon including an objective, a rotatable member mounted outside of the cabinet a scale carrying data mounted on the disk and adapted to be positioned opposite said aperture and in the field of said objective and a second scale visibly mounted on the disk for adjusting the first scale opposite said aperture whereby said data may be photographed by said camera through said aperture.

6. In a photographic recording machine, the combination with a cabinet having walls one of which is apertured, of a camera mounted thereon including an objective, at an angle to the apertured wall, a disk carrying data mounted on said apertured wall and adapted to position said data for exposure in the field of said objective in front of said aperture, and means inside of said cabinet for reflecting the light rays passing through the aperture from said data to said camera.

7. In a photographic recording machine, the combination with a cabinet having walls one of which is apertured, of a camera mounted thereon, at an angle to the apertured wall, a disk carrying data mounted on said apertured wall and adapted to position said data for exposure in front of said aperture, means for illuminating the inside of said cabinet, a mirror for reflecting light rays passing through said aperture from said data to said camera, said mirror also being adapted to reflect light rays from said lamp to said data.

8. In a photographic recording machine, the combination with a camera, of an objective for focusing objects at a predetermined distance on a photographic film, a disk rotatably mounted on said cabinet, a scale on the disk bearing a plurality of markings thereon, there being an aperture in the plate for each mark, an apertured plate through which one marking at a time may be positioned for photographing by said camera, and means for locating each individual marking at the apertured plate comprising a snap latch adapted to engage any one aperture of said disk.

9. In a photographic recording machine, the combination with a camera, of an objective for focusing objects at a predetermined distance on a photographic film, a disk rotatably mounted on said cabinet, a scale on the disk bearing a plurality of markings thereon, an apertured plate through which one mark at a time may be positioned for photographing by said camera, means for locating an individual marking at the aperture comprising a latching device between the cabinet wall and disk, said latching device including a spring plunger carried by one part and depressions for holding the plunger carried in the other part, said depressions being spaced in accordance with the individual markings on said disk.

Signed at Rochester, New York, this 18th day of May, 1929.

ROY S. HOPKINS.